United States Patent [19]

Colombo et al.

[11] Patent Number: 4,614,764

[45] Date of Patent: Sep. 30, 1986

[54] LINEAR LOW DENSITY ETHYLENE POLYMERS BLENDED WITH MODIFIED LINEAR LOW DENSITY ETHYLENE POLYMERS

[75] Inventors: Edward A. Colombo; Tae H. Kwack, both of Fairport; Tien-Kuei Su, Pittsford, all of N.Y.

[73] Assignee: Mobil Oil Corporation, New York, N.Y.

[21] Appl. No.: 708,911

[22] Filed: Mar. 6, 1985

[51] Int. Cl.$^4$ .................... C08L 23/08; C08L 23/26
[52] U.S. Cl. .................................. 525/72; 525/193; 525/194; 525/240
[58] Field of Search .................. 525/193, 194, 72, 240

[56] References Cited

U.S. PATENT DOCUMENTS

| | | | |
|---|---|---|---|
| 3,646,155 | 2/1972 | Scott | 260/827 |
| 3,696,069 | 10/1972 | Schrage et al. | 525/72 |
| 4,117,195 | 9/1978 | Swarbrick et al. | 428/379 |
| 4,228,255 | 10/1980 | Fujimoto et al. | 525/288 |
| 4,252,906 | 2/1981 | Hosokawa et al. | 521/86 |
| 4,289,860 | 9/1981 | Glander et al. | 525/263 |
| 4,320,214 | 3/1982 | Harayama et al. | 525/264 |
| 4,390,666 | 6/1983 | Moriguchi et al. | 525/194 |
| 4,438,238 | 3/1984 | Fukushima et al. | 525/240 |
| 4,460,750 | 7/1984 | Thiersault et al. | 525/338.8 |
| 4,508,872 | 4/1985 | McCullough | 525/194 |

FOREIGN PATENT DOCUMENTS

| | | | |
|---|---|---|---|
| 2546172 | 11/1984 | France | 525/72 |
| 0063453 | 6/1978 | Japan | 525/193 |
| 2019412 | 10/1979 | United Kingdom . | |

*Primary Examiner*—Wilbert J. Briggs, Sr.
*Attorney, Agent, or Firm*—Alexander J. McKillop; Michael G. Gilman; Edward J. Trojnar

[57] ABSTRACT

The properties of linear ethylene polymers, especially linear, low density polyethylene (LLDPE), are improved by adding a chemically modified ethylene polymer to the base resin. The modification is brought about by the use of a free radical generator, preferably an organic peroxy compound such as benzoyl peroxide, optionally with an unsaturated silane such as vinyl trimethoxy silane. The use of the modified resin masterbatch enhances the crystallization of the polymer and improves the melt strength of the polymer, providing greater bubble stability in the blown tubular film extrusion process so that higher operating speeds may be employed. In addition, the films produced from the blends have improved antiblocking properties without significant deterioration of mechanical properties.

25 Claims, No Drawings

LINEAR LOW DENSITY ETHYLENE POLYMERS BLENDED WITH MODIFIED LINEAR LOW DENSITY ETHYLENE POLYMERS

FIELD OF THE INVENTION

This invention is directed to the improvement of properties of ethylene polymers, especially linear, low density ethylene polymers. In particular aspects, it provides for the enhancement of the crystallization properties of linear ethylene polymers, for increasing the melt strength of the polymers so that improved bubble stability is achieved in the blown tubular film process and for other improvements in the properties of the polymers and of films produced from them. In one particular aspect, it provides for improvements in the antiblocking properties of films made from the polymers.

BACKGROUND OF THE INVENTION

A number of different types of ethylene polymers are presently known and in widespread use. Thus, high pressure (low density) polyethylene produced by the free radical polymerization of ethylene is generally characterized by a branched chain structure containing a variety of types of short chain as well as long chain branches. High density polyethylene, produced by the polymerization of ethylene under relatively low pressures using catalysts comprizing mixtures of transition metal compounds and aluminum alkyls, are generally linear in structure, lacking side chain branches. Its density is usually at least 0.940, with homopolymers generally having relative densities of at least 0.960. Another type of ethylene polymer whose commercial production is now well established is linear low density polyethylene (LLDPE) which is a copolymer of ethylene with minor amounts, usually less than 20%, of a higher alpha-olefin such as butene, hexene, methylpentene, octene or decene. LLDPE is produced by the polymerization of ethylene in the presence of the requisite comonomer using a catalyst of the transition metal/aluminum alkyl type and the product is characterized by a linear structure, having long sequences of methylene units with periodic, uniform side chains distributed statistically along the molecular chain, whose nature depends upon the identity of the comonomer. The short chain branching interferes with crystallization of the main chains and since the crystalline regions display a higher density than noncrystalline regions, the ramification lowers the density. The density of LLDPE is generally below 0.940, usually in the range 0.910 to 0.940 (all densities referred to in this specification are relative densities).

Linear low density polyethylene has a number of properties which make it superior to conventional high pressure polyethylene (HP-LDPE) at similar melt indices and densities. LLDPE will generally possess higher tensile strength, flexural modulus, better elongation and stress-crack resistance. However, the rheology of molten LLDPE differs from that of conventional high pressure polyethylene and at comparable melt indices and densities, LLDPE displays a higher viscosity that decreases less rapidly with increasing shear stress than that of a high pressure (low density) polyethylene.

In general terms, the degree of viscosity decrease depends upon the molecular weight, molecular weight distribution and molecular conformation of the polymer. Broad molecular weight distribution and long chain branching are related to enhaced shear thinning behavior in the shear rate range used in resin extrusion. These factors combine so that conventional high pressure, low density polyethylene (HP-LDPE) which commonly has a relatively broad molecular weight distribution as well as long chain branching, exhibits a more marked viscosity decrease under extrusion shear conditions than LLDPE which has only short chain branching and a relatively narrow molecular weight distribution. Other differences between high pressure, low density polyethylene (HP-LDPE) and LLDPE are found in the behavior of the polymer melt during extension. The extensional viscosity of high pressure, low density polyethylene increases with increasing strain rate and the resin is said to be strain hardening. By contrast, LLDPE shows a markedly different behavior with relatively little strain hardening, at least at low strain rates. These differences in rheology may be expressed in simple terms by stating that compared to high pressure, low density polyethylene (LDPE), the linear, low density polymer (LLDPE) is stiff in shear and soft in extension. These and other differences between these polymers are described in greater detail in U.S. Pat. No. 4,243,619 and in the article "Film Extrusion of Low Pressure LDPE"; Fraser, W. A. et al., TAPPI 1980 (1980 TAPPI Paper Synthetics Course Proceedings), to which reference is made for such details.

One consequence of the rheological differences is that equipment used to fabricate high pressure (low density) polyethylene may be unsuitable in some instances for processing LLDPE at commercially acceptable rates. Although this problem may be wholly or partly overcome by making LLDPE resins to a higher melt index than their high pressure counterparts, it would be nonetheless desirable to improve the properties of LLDPE so that it could be fabricated more readily on conventional processing equipment.

One type of fabrication process which may be used with the various types of polyethylene is the blown film process in which a molten tube of the resin is extruded, generally in a vertically upwards direction to a set of nip rolls, usually about 2 to 7 m. above the extrusion die. A free standing bubble is formed by the injection of air into the interior of the bubble, this internal pressure serving to expand the tube by about two to five times its original diameter and to confer a transverse direction (TD) molecular orientation on the film. At the same time, a longitudinal or machine direction (MD) orientation is created by taking up the cooled film through the nip rolls at a speed greater than the extrusion speed. After passing through the nip rolls the film may be cooled further and rolled up or passed to further processing steps, e.g. slitting and forming. The blown film process is described in further detail in Encyclopedia of Chemical Technology, Kirk-Othmer, Third Edition, John Wiley & Sons, New York 1981, Vol. 16, pp 416-417 and Vol. 18, pp 191-192, to which reference is made for details of the process.

One particular problem encountered in the fabrication of films by the blown tubular film process is that the strain hardening behavior of high pressure, low density polyethylene imparts good bubble stability to the process; the polymer is said to have good melt strength and the film may be extruded at commercially satisfactory speeds (it should, however, be noted that the same strain hardening behavior may restrict the level of drawdown which can be achieved since the melt is capable of showing unbounded stress growth during elongation and for this reason, relatively narrow die gaps are used so that the desired final film gauge can be achieved without excessive drawdown). The linear polymer, by contrast, does not have such good bubble stability because it does not exhibit the same strain hardening behavior, i.e. it does not have good melt strength. This imposes a constraint upon the speed with which LLDPE can be extruded into a film and generally, it has been found necessary to operate LLDPE blown film operations at speeds which are lower than those which can be used with the high pressure polymer. Similar constraints may also arise in slot cast film production, again limiting the extrusion speeds which can be commercially employed. This is obviously undesirable from the economic point of view; it would therefore be desirable to increase the melt strength of LLDPE in order to permit it to be made into film at higher speeds. Furthermore, if the crystallization rate could be enhanced this would also be advantageous because higher line speeds will tend to move the frost line in blown film extrusion higher up the bubble.

Other differences between the properties of the polymers may also be noted when they are fabricated with finished products. For instance, one characteristic of LLDPE and certain other polyethylene films is that they tend to block or adhere together in a non-permanent but relatively strong bond after the films have been in face-to-face contact under pressure for some time. Rolls of the film may be difficult to unwind if the take-up tension has been great enough to cause a significant amount of blocking to take place and surface imperfections may be created as the roll is unwound. Although the phenomenon of blocking may be put to use in certain laminate products, it would be desirable to have some means of reducing the blocking tendencies of the films.

Proposals have been made for improving the properties of LLDPE in various ways, for example, by treatment with organic peroxides, as described in U.S. Pat. No. 4,460,750. In this case, the improvements achieved are stated to be in the transparency of the film. Treatment with peroxides has, however, the disadvantage that various properties of the film do suffer, notwithstanding assertions to the contrary in U.S. Pat. No. 4,460,750. In particular, the mechanical strength of the film, as measured by the elongation, toughness and tear strength, have been found to be undesirably low following treatment with peroxides. Other treatments for LLDPE using peroxides and unsaturated silane compounds to promote cross-linking in order to form improved wire coating materials are described in U.S. Pat. Nos. 4,320,214, 4,289,860, 4,252,906, 4,228,255, 4,117,195 and 3,646,155.

Additives for improving the antiblocking properties of films are known and are commercially available. They are members of a large family of parting agents known as abherents and in the polyolefin field, are often referred to as slip agents. They may be chosen from a wide variety of materials including natural and synthetic waxes, fatty acid salts and various polymers and inorganic compounds such as silica and silicates. However, these additives are generally single purpose materials which do not usually have any other significant effect upon the film properties.

SUMMARY OF THE INVENTION

It has now been found that a number of improvements in the properties of LLDPE and other linear ethylene polymers may be made by adding a chemically modified polymer to the polymer. The modified polymer is produced by the incorporation of a free radical generator, either alone or in combination with an unsaturated silane compound, into the polymer to form a modified polymer masterbatch. This masterbatch is then blended, in minor amounts, with the base polymer to form the desired polymer which may then be fabricated into the desired form, e.g. by extrusion.

The use of the modified polymer, brings about a number of improvements in the polymers as well as in their processing. First, it increases the crystallization rates and temperatures of the polymers and this improvement alone would permit a greater film output when the resin is used for film production. Second, it increases the elongation viscosity of the resin, that is, it increases the melt strength of the resin. This is a particularly notable advantage because it brings about an improvement in the bubble stability when the resin is being fabricated into film by the blown tubular film process. Third, films produced from the polymers have reduced antiblocking properties as well as manifesting improvements in other mechanical properties, including elongation, modulus, toughness and resistance to tearing.

According to the present invention, we therefore provide a polymer blend comprising a linear ethylene polymer and a linear ethylene polymer modified with a free radical generator, optionally with the addition of an unsaturated silane compound. There is also provided a method of increasing the crystallization rate and temperature and the elongation viscosity of a linear ethylene polymer by adding the modified polymer to the base polymer. The invention also provides for a tubular film blowing process using the blends and films produced from the blends with improved antiblocking properties.

DETAILED DESCRIPTION

The improvements may be attained with a variety of linear ethylene polymers, including high density homopolymers and copolymers of ethylene. These high density materials will generally have densities of at least 0.940 in the case of copolymers and generally, of at least 0.960 in the case of homopolymers. The effects are, however, most noted with linear, low density polyethylene (LLDPE), that is, with the copolymers of ethylene with minor amounts, typically up to 20 weight %, of a higher alpha-olefin comonomer such as butene, hexene, 4-methyl-pentene-1, octene, decene or dodecene produced by polymerization in the presence of a transition metal/aluminum alkyl catalyst. Linear low density polyethylenes of this kind will generally have a melt index (ASTM D-1238) less than 3 and a density of not more than 0.940, generally less than 0.930.

The characteristics of the ethylene polymers are improved by the addition of a polymer masterbatch which has been modified by treatment with a free radical generator. Free radical generators of this kind are typically those materials used in the free radical initiated polymerization of ethylene and other olefins. Generally, they will be either organic peroxides, peresters or organic azo compounds. Typical peroxy compounds include benzoyl peroxide, di-chlorobenzoyl peroxide, dicumyl peroxide, di-tert-butyl peroxide, 4,5-dimethyl-2,5-di(peroxy benzoate)hexyne-3, 1,3-bis(tert-butyl peroxy isopropyl)benzene, lauroyl peroxide, tert-butyl peracetate, 2,5-dimethyl-2,5-di(tert-butylperoxy)hexyne-3, 2,5-dimethyl 2,5-di(tert-butyl-peroxy)hexane and tert-butyl perbenzoate. Azo compounds, such as azobisisobutyronitrile and dimethylazodiisobutyrate, are also operable. Dicumyl peroxide is the most preferred among these compounds. The amount of the free radical generating compound which is employed is generally within the range of 0.01 to 5.0, preferably 0.025 to 2.0 weight percent of the polyolefin employed in the masterbatch.

The free radical generator is preferably used with an unsaturated organic silane compound which contains at least two hydrolyzable organic radicals. Thus, the preferred organic silane compounds have the formula $RR'SiY_2$ where R is a monovalent, olefinically unsaturated hydrocarbon or hydrocarbonoxy radical such as vinyl, allyl, butenyl, cyclohexenyl, cyclopentadienyl, cyclohexadienyl or alkyl or oxyalkyl groups with an acrylic or methacrylic substituent, R' is Y or a monovalent hydrocarbon radical such as an alkyl group, e.g. methyl, ethyl, propyl, tetradecyl, octadecyl, or an aryl group such as phenyl, benzyl or tolyl. Y is a hydrolyzable organic radical such as an alkoxy group such as methoxy, ethoxy, propoxy or butoxy, acyloxy such as formyloxy, acytoxy and propianoxy, an oximino group, an alkyl amino group or an aryl amino group. The preferred silane compounds are the vinyl silanes, particularly the vinyl trialkoxy silanes such as vinyl trimethoxysilane and vinyl triethoxysilane. The silane compound, if used, will generally be used in an amount from 0.01 to 5.0, preferably 0.025 to 2.0, percent by weight based on the total weight of the resin masterbatch.

When the silane compound is used, a silanol condensation catalyst is preferably included such as dibutyltin dilaurate, stannous acetate, dibutyltin diacentate, dibutyltin dioctoate, lead naphthenate, zinc caprylate, cobalt naphthenate, tetrabutyl titanate, tetranonyl titanate, lead stearate, zinc stearate, cadmium stearate, barium stearate, and calcium stearate. The most preferred catalysts are the organic tin compounds for example, dibutyltin dilaurate, dibutyltin diacetate, and dibutyltin dioctoate. The condensation catalyst should preferably be present in a quantity within the range of 0.05 to 0.5 weight percent of the polyolefin in the resin masterbatch.

The free radical generator and the silane compound, if used, are reacted first with a quantity of the polymer to form a resin masterbatch. Reaction between the polymer and the other materials is carried out at an elevated temperature, suitably from 100° to 250° C., preferably 150° to 200° C., under an inert atmosphere, e.g. nitrogen. Compounding time is suitably at least 2 minutes and generally will not exceed 10 minutes at the specified temperatures although the treatment time will generally vary inversely according to the temperature selected. Compounding may be carried out in an extruder or a suitable compounder such as a Brabender (trademark) mixer or a Banbury mixer which will reduce the resin to a plastic mass at an appropriate temperature for reaction with the free radical generator and the silane, if present.

Once a resin master batch has been prepared, it may be compounded with the unmodified polymer. Generally, the master batch will be blended with the unmodified resin in minor amounts, that is, less than half the total resin composition by weight, more usually in the range of 5 to 40%, preferably 10 to 30% by weight of the total resin composition, excluding inert fillers, pigments and other adjuvants and ingredients. The polymer used for the masterbatch will normally be the same as the main body of the resin but need not be. Both the masterbatch and the rest of the resin may themselves be blends of different linear ethylene polymers. Other polymers, e.g. elastomers, rubbers and other ingredients such as fillers, pigment additives, e.g. antioxidants may be present in order to provide desired properties to the final blends.

The use of the modified resin masterbatch has, as previously mentioned, a number of advantages. First, it improves the crystallization characteristics of the polymer by increasing the crystallization temperature and crystallization rate. This enables the resin to be extruded under more favorable conditions, using higher extrusion rates in continuous extrusion processes such as slot casting of film and tubular film blowing. In blown film extrusion, the frost line marking the boundary between the molten and crystallized resins will be lower because of the higher crystallization rate and temperature and this, in itself, indicates the potential for faster extrusion rates. In non-continuous operations such as injection molding, cycle times may be shortened since crystallization will take place more swiftly than with the unmodified polymer.

When added to the unmodified base polymer, the modified masterbatch also brings about an increase in the elongation viscosity of the molten polymer, that is, it improves the melt strength of the polymer. This brings with it a number of advantages in the processing of the polymers, particularly in the tubular film blowing process where previously, the poor bubble instability of LLDPE has generally restricted operating speeds to values below those used with the conventional branched-chain, high pressure polymers. The improved bubble stability obtained with the present blends of modified and unmodified blends permits higher extrusion rates to be used while still retaining other advantages of LLDPE. The improved melt strength is also of value in the fabrication of cast film. Although an increase in shear viscosity has been noted, it is not too great and does not create any excessive increase in extrusion pressure.

These advantages manifest themselves principally in the processing and fabrication of the polymers but they are not the only advantages conferred by the use of the modified masterbatches. In addition, the antiblocking properties of films produced from the polymers are improved and this, without a significant deterioration in the mechanical properties of the resins or of the films and other articles produced from them, for example, the elongation, modulus, toughness and resistance of tearing. In fact, improvements in certain of these properties may be noted. The use of the modified masterbatches is advantageous in this respect in that if the free radical generators are added to the entire mass of the resin, some at least of the mechanical properties of the resin tend to deteriorate even if other improvements such as crystallization are improved. Furthermore, improved optical qualities, especially of transparency have been perceived in the modified masterbatch at relatively high levels of free radical generator addition, e.g. 2500 ppm and it is believed that this may be attributed to the smaller crystal size arising from the presence of the free radical generator.

The resin blends of modified masterbatch and unmodified base polymer may be fabricated according to general procedures, e.g. injection molding, slot casting and blown tubular film production but the properties of the blends will generally permit faster production rates to be used, as described above, together with other advantages as previously mentioned.

The invention is illustrated by the following Examples in which all proportions and percentages are by weight unless the contrary is stated.

EXAMPLES 1 TO 3

A commercially available linear low density polyethylene (Union Carbide GERS 7942 (Melt Index (ASTM D-1238), 2.0, density 0.9204) was modified with vinyl trimethoxy silane and t-butyl peroxypivalate or t-butyl hydroperoxide as free radical generators. The amounts used are shown in Table 1 below.

TABLE 1

LLDPE Compositions

| Example | LLDPE | Silane | Tert-butyl Hydroperoxide | Tert-butyl peroxypivalate |
|---|---|---|---|---|
| 1 | 100 | — | — | — |
| 2 | 98.523 | 0.985 | — | 0.492 |
| 3 | 98.523 | 0.985 | 0.492 | — |

The compositions were compounded at 190° C. for five minutes under a nitrogen atmosphere using a Brabender (trademark) mixer. The compounded resins were then molded using a hot press at 180° C. and then cooled to room temperature. The crystallization rate and half crystallization time of each molded specimen were measured using a differential scanning calorimeter (Perkin Elmer DSC-2). The results are shown in Table 2 below.

TABLE 3

Effect of Chemically Modified Masterbatch on Crystallization of LLDPE Resins

| Ex. No. | Resin | Crystallization Peak Temperature, °C. | |
|---|---|---|---|
| | | 20° C. min$^{-1}$ | 40° C. min$^{-1}$ |
| 4 | LLDPE (unmodified) | 97 | 93 |
| 5 | 88/12, GERS 7942/M1 | 99 | 96 |
| 6 | 75/25, GERS 7942/M1 | 99 | — |
| 7 | 75/25, GERS 7942/M2 | 102 | — |

The results in Table 3 show that the use of the masterbatch produces a significant increase in the crystallization at peak temperature of the resin blend.

EXAMPLES 8–18

Modified resin masterbatches were prepared by adding a peroxy-type free radical generator to a pelletized LLDPE (Mobil Chemical Co. Grade MLA-043, density 0.9180, melt index ASTM D-1238 2.0) together with any silane and condensation catalyst used and tumble mixing in a rotary mixer for 10 minutes. The mixture was then extruded through a slit die attached to a 32 mm. (1.25 inch) extruder. A strip of melt sheet coming out of the slit die was quenched in a water bath and then pelletized with a pelletizer to form the masterbatch. The masterbatches were then individually blended with the pelletized unmodified resin by tumble-mixing in a rotary mixer and the mixtures were then extruded to make blown films.

TABLE 2

LLDPE Crystallization Properties

| | Crystallization Temp. (°C.) | | | | Half Crystallization Time | | | | | |
|---|---|---|---|---|---|---|---|---|---|---|
| | Peak Temp. | | Initiation Temp. | | $t_{\frac{1}{2}}$ (sec), at temp °F. | | | | | |
| Ex. No. | 20° C./ min.* | 40° C./ min.* | 20° C./ min.* | 40° C./ min.* | 384.2 | 385.2 | 386.2 | 387.2 | 388.2 | 389.2 |
| 1 | 101 | 97 | 104 | 100 | 150 | 270 | 420 | | | |
| 2 | 104 | 100 | 108 | 104 | | | | 66 | 108 | 195 |
| 3 | 102 | 98 | 106 | 102 | | 120 | 180 | 282 | | |

Note:
*Cooling rate from melt state

Table 2 shows that the incorporation of silane and peroxide to the LLDPE increases the crystallization temperature from 1° to 4° C., depending on the cooling rate and peroxide employed.

EXAMPLES 4 TO 7

A resin master batch was made up by compounding the LLDPE of Example 1 (Union Carbide GERS 7942) with 1% of vinyl trimethoxysilane and 0.5% of t-butyl peroxide. Compounding was carried out as described in Examples 1 to 3 to form a resin masterbatch which is identified below as master batch M1. A similar resin master batch, identified below as master batch M2 was made up using 1% of dicumyl peroxide.

The master batches were blended with the base resin in varying amounts and the crystallization properties were determined in the same manner as described above in Examples 1 to 3. The results are given in Table 3 below.

The compositions of the masterbatches and the blends are set out in Table 4 below. The ratios of the masterbatch to base resin are shown for Examples 11–18, by the ratios indicated.

TABLE 4

Resin Blends for Blown Films

| Ex. No. | Virgin LLDPE and Its Blends with Modified Resins |
|---|---|
| 8 | MLA-043 (unmodified base resin) |
| 9 | MLA-043 + 1.0% silane + 0.2% t-bpp |
| 10 | MLA-043 + 1.0% silane + 0.2% t-bpp + 0.2% T-12 |
| 11 | MLA-043/MLA-043 + 1.0% silane + 0.1% t-bpp, 80/20 |
| 12 | MLA-043/MLA-043 + 1.0% silane + 0.1% t-bpp, 60/40 |
| 13 | MLA-043/MLA-043 + 500 ppm Dicup, 80/20 |
| 14 | MLA-043/MLA-043 + 500 ppm Dicup, 60/40 |
| 15 | MLA-043/MLA-043 + 250 ppm Dicup, 60/40 |
| 16 | MLA-043/[MLA-043/PA 24 (90/10) + 250 ppm Dicup], 80/20 |
| 17 | MLA-043/[MLA-043/PA 24 (90/10) + 250 ppm Dicup], 60/20 |
| 18 | MLA-043/MLA-043 + 1.0% silane + 0.2% t-bpp + |

TABLE 4-continued

Resin Blends for Blown Films

| Ex. No. | Virgin LLDPE and Its Blends with Modified Resins |
|---|---|
| | 0.5% T-12, 80/20 |

Text
MLA-043 = LLDPE (Mobil Chemical Co., Grade MLA-043)
PA 24 = Ethylene-propylene elastomer (Exxon Chemical Co.)
t-bpp = t-butyl peroxypivalate
Dicup = Dicumyl peroxide
T-12 = Dibutyltindilaurate
Silane = Vinyl trimethoxy silane The extrusion conditions used are shown in Table 5 below, the mechanical properties of the blown film specimens in Table 6 and the antiblocking properties of the films in Table 7. For the antiblocking tests the blown films were maintained in surface-to-surface contact at 52° C. (125° F.) under a pressure of 860 kPa (125 psi) for 72 hours, after which the peeling tests were carried out by measuring the peeling force required to separate the films, using an Instron (trademark) tester at a crosshead speed of 12.7 cm. min$^{-1}$ (5 in. min.$^{-1}$) with an initial jaw separation of 2.5 cm (1 in.).

The yield, ultimate tensile strength, elongation at break, toughness and modulus were determined by ASTM D-882 and the tear strength by ASTM D-1922.

TABLE 7

Antiblock Properties of Blown Films

| | In/In Measurements, g.in.$^{-1}$ | | | Out/Out Measurements, g.in.$^{-1}$ | | |
|---|---|---|---|---|---|---|
| Ex. | 1 | 2 | Avg. | 1 | 2 | Avg. |
| 8 | 2.8 | 2.9 | 2.9 | 2.8 | 2.6 | 2.7 |
| 9 | 2.0 | 2.2 | 2.1 | 2.0 | 1.7 | 1.9 |
| 10 | 1.5 | 1.2 | 1.4 | 0.6 | 0.7 | 0.7 |
| 11 | 2.8 | 2.6 | 2.7 | 2.8 | 2.7 | 2.8 |
| 12 | 2.8 | 2.9 | 2.9 | 2.4 | 2.5 | 2.5 |
| 13 | 2.4 | 2.3 | 2.4 | 1.9 | 1.8 | 1.9 |
| 14 | 2.4 | 2.6 | 2.5 | 2.1 | 2.5 | 2.3 |
| 15 | 2.3 | 2.2 | 2.3 | 2.0 | 1.9 | 2.0 |
| 16 | 2.5 | 2.6 | 2.6 | 2.6 | 2.1 | 2.4 |
| 17 | 2.3 | 2.3 | 2.3 | 2.5 | 2.4 | 2.5 |
| 18 | 2.6 | 3.0 | 2.8 | 2.2 | 2.0 | 2.1 |

Note:
In/In and Out/Out refer to the surfaces of the blown film bubble pressed in contact with one another, i.e. In/In refers to the two inside surfaces and Out/Out to the two outside surfaces.

The results set out above indicate that the use of peroxy free radical generators with the silane improves the melt strength of the polymer but that the mechanical properties of the resin suffer (compare Example 8 (base resin) with Examples 9 and 10). However, when the peroxide is added to the masterbatch, the extrusion characteristics are improved without any loss in mechanical properties; in fact, improvements in the me-

TABLE 5

Processing Conditions

| | Temperature (°C.) | | | | | | Extrusion | Dial | Screw | % | Output | | | Film | FHR | P | Shear |
| | Extruder | | | Die | | | Pressure | | | | | BUR | TUR | Gauge, | | (in. | Rate |
| Ex. | 1 | 2 | 3 | 1 | 2 | Tm | psi | Set | RPM | Load | lb/hr/in | A/ao | V/vo | (mil) | H/ao | H$_2$O) | (sec$^{-1}$) |
|---|---|---|---|---|---|---|---|---|---|---|---|---|---|---|---|---|---|
| 8 | 275 | 325 | 325 | 392 | 392 | 415 | 2350 | 14 | 25 | 42 | 1.53 | 2.12 | 21.5 | 1.0 ± 0.1 | 5.66 | 0.43 | 21.1 |
| 9 | 275 | 325 | 325 | 392 | 392 | 414 | 2400 | 14.5 | 26 | 32 | 1.52 | 2.12 | 21.7 | 1.0 ± 0.1 | 3.00 | 1.50 | 21.1 |
| 10 | 275 | 325 | 325 | 392 | 392 | 413 | 2800 | 18 | 32 | 25 | 1.52 | 2.12 | 21.7 | 1.0 ± 0.1 | 5.00 | 2.10 | 21.1 |
| 11 | 275 | 325 | 325 | 392 | 392 | 415 | 2400 | 15 | 27 | 46 | 1.58 | 2.12 | 23.4 | 1.0 ± 0.1 | 5.66 | 0.43 | 21.8 |
| 12 | 275 | 325 | 325 | 392 | 392 | 409 | 2450 | 15 | 26 | 46 | 1.55 | 2.12 | 23.8 | 1.0 ± 0.1 | 5.66 | 0.44 | 21.4 |
| 13 | 275 | 325 | 325 | 392 | 392 | 412 | 2680 | 14.5 | 26 | 46 | 1.53 | 2.12 | 21.5 | 1.0 ± 0.1 | 6.33 | 1.25 | 21.1 |
| 14 | 275 | 325 | 325 | 392 | 392 | 412 | 2850 | 15.2 | 27 | 46 | 1.53 | 2.12 | 21.5 | 1.0 ± 0.1 | 6.33 | 1.40 | 21.1 |
| 15 | 275 | 325 | 325 | 392 | 392 | 409 | 2580 | 15 | 26 | 41 | 1.48 | 2.12 | 22.1 | 1.0 ± 0.1 | 7.00 | 1.15 | 20.5 |
| 16 | 275 | 325 | 325 | 392 | 392 | 413 | 2450 | 14 | 25 | 43 | 1.53 | 2.12 | 21.5 | 1.0 ± 0.1 | 7.00 | 1.24 | 21.0 |
| 17 | 275 | 325 | 325 | 392 | 392 | 415 | 2550 | 14.5 | 26 | 44 | 1.52 | 2.12 | 21.7 | 1.0 ± 0.1 | 7.00 | 1.15 | 20.9 |
| 18 | 275 | 325 | 325 | 392 | 392 | 410 | 2400 | 14 | 25 | 43 | 1.48 | 2.12 | 22.1 | 1.0 ± 0.1 | 5.66 | 0.43 | 20.5 |

Text
Tm = Melt temperature in pipe before die
BUR = Blow-up ratio (relative diameters)
TUR = Take-up ratio (relative speeds)
FHR = The absolute height of frost line divided by die radius
P = Pressure difference across bubble
Shear Rate = Shear rate at die lip chanical properties may be noted. These improvements may be obtained with masterbatches containing peroxide alone (Exs. 13-17) or with additional silane (Exs. 11,

TABLE 6

Mechanical Properties of Blown Films

| Resin Code No. | Gauge (mils) | | Yield (psi) | | Ultimate (psi) | | Elongation (%) | | Toughness | | Modulus (psi) | | Tear (gr/mil) | |
|---|---|---|---|---|---|---|---|---|---|---|---|---|---|---|
| | MD | TD | MD | TD | MD | TD | MD | TD | MD | TD | MD | TD | MD | TD |
| 8 | 0.98 | .97 | 1410 | 1503 | 4433 | 2832 | 743 | 698 | 1377 | 1014 | 29774 | 29805 | 81 | 299 |
| 9 | 1.02 | 1.05 | 1393 | 1382 | 5421 | 3737 | 672 | 896 | 1572 | 1518 | 29519 | 32107 | 42 | 370 |
| 10 | 1.01 | 1.14 | 1444 | 1053 | 3735 | 2410 | .497 | 813 | 1042 | 966 | 27689 | 28107 | 18 | 199 |
| 11 | 0.93 | 1.00 | 1466 | 1390 | 5071 | 3148 | 743 | 777 | 1557 | 1173 | 28594 | 32767 | 75 | 305 |
| 12 | 0.90 | 0.97 | 1431 | 1377 | 4732 | 3427 | 720 | 826 | 1445 | 1303 | 28537 | 33819 | 74 | 306 |
| 13 | 0.96 | .96 | 1435 | 1489 | 4898 | 3260 | 715 | 635 | 1561 | 1023 | 29489 | 30841 | 62 | 236 |
| 14 | 1.20 | 1.26 | 1497 | 1521 | 5094 | 3632 | 722 | 754 | 1714 | 1285 | 32113 | 37439 | 39 | 242 |
| 15 | 1.04 | 1.03 | 1415 | 1362 | 4967 | 3248 | 741 | 662 | 1580 | 1026 | 26758 | 30266 | 73 | 261 |
| 16 | 0.94 | 1.01 | 1407 | 1385 | 4861 | 3319 | 756 | 687 | 1539 | 1079 | 26703 | 27957 | 96 | 245 |
| 17 | 1.14 | 1.03 | 1328 | 1269 | 4740 | 3224 | 740 | 694 | 1489 | 1026 | 23665 | 27031 | 76 | 237 |
| 18 | 1.00 | 1.02 | 1395 | 1440 | 4584 | 3538 | 798 | 958 | 1570 | 1563 | 29721 | 34276 | 59 | 281 |

12, 18). Note that the improvement in bubble stability is related to the increased pressure across the bubble.

In the antiblocking tests, the results shown that improvements in the antiblocking properties may be obtained without significant loss in mechanical properties, as shown in Table 6.

EXAMPLES 19-20

The effectiveness of the modified masterbatch in improving the bubble stability and hence, the maximum operating speeds in film manufacture was shown using a commercial scale tubular film blowing unit. The resins used were Dowlex (trademark) LLDPE, grades 2101 and 2032 having properties as follows:

Dowlex 2101 MI=2, density=0.920
Dowlex 2032 MI=2, density=0.926

A modified masterbatch of the Dowlex 2101 resin was made up by mixing the resin pellets with 100 ppm dicumyl peroxide in a Banbury mixer after which the masterbatch was extruded, quenched in water and cut into pellets. The pelletized masterbatch was mixed with the unmodified base resin (80/20 ratio, base:masterbatch) and extruded under the conditions shown to form a co-extruded two layer film. For comparison, a similar film was produced from the LLDPE resins without the added modified masterbatches. Both films were produced using the same equipment with two extruders for the different film layers.

The conditions used and results obtained are shown in Table 8 below.

TABLE 8

LLDPE Blown Film Extrusion

|  | Ex. 19 | Ex. 20 |
|---|---|---|
| Resin |  |  |
| Inner | 2101 | 2101/2101 MB |
| % | 100 | 80/20 |
| Outer | 2032 | 2101/2101 MB |
| % | 100 | 80/20 |
| Film Gauge, microns | 3.7 | 3.75 |
| mils | 1.46 | 1.48 |
| Extruder A (Inner Layer) |  |  |
| Melt, °C. | 234 | 243 |
| Pressure, mPa(g.) | 41.4 | 45.5 |
| Extruder B (Outer Layer) |  |  |
| Melt, °C. | 245 | 259 |
| Pressure, mPa(g.) | 34.5 | 38.6 |
| Production | 100 | 112 |
| Line speed (arbitrary units) |  |  |
| Product |  |  |
| Film Index | 116 | 124 |
| End Use Index | 154 | 153 |
| Quality Index | 135 | 138 |
| Dart Drop, total energy | 14.9 | 14.8 |

In this comparative testing it was found that the highest speed at which the line could be operated with the unmodified LLDPE resins (Ex. 19) was 100 (in arbitrary units), this limitation being imposed by bubble instability at higher speeds. However, when the unmodified resins were replaced by the blends of modified masterbatch (MB) with the base resin, the line could be operated at a significantly higher rate; in fact, the maximum operating rate observed (112 units) was limited only by the capacity of a subsequent fabricating unit. Bubble stability appeared to be completely satisfactory and would have supported operation at higher line speeds.

That these improvements in extrusion speed were not bought at the expense of film quality are shown by the product characteristics. The Film Index is an arbitrarily weighted average of certain film properties; the End Use Index is another arbitrarily weighted average of certain properties related to the potential utilities of the film and the Quality Index is the arithmetic average of the two other indices. As the results show, there is an improvement in Film Index with comparable values for the two other indices and the Dart Drop test.

We claim:

1. A blown plastic resin film of improved properties made from a blend of a linear, low density ethylene polymer and 5 to 30 weight percent of the blend of a linear, low density ethylene polymer which has been modified by reaction in the molten state with a free radical generator.

2. A film according to claim 1 in which the free radical generator comprises an organic peroxy compound.

3. A film according to claim 2 in which the peroxy compound comprises t-butyl peroxy pivalate, t-butyl hydroperoxide or dicumyl peroxide.

4. A film according to claim 1 in which the modified polymer is modified by reaction with an unsaturated organic silane compound in the presence of the free radical generator.

5. A film according to claim 4 in which the silane compound vinyl trimethoxysilane or vinyl triethoxysilane.

6. A film according to claim 1 in which the amount of free radical generator is from 0.01 to 5 weight percent of the modified polymer.

7. A film according to claim 4 in which the amount of unsaturated silane compound is from 0.01 to 5 weight percent of the modified polymer.

8. A film according to claim 1 produced by the tubular film blowing process.

9. A blown plastic resin film according to claim 1 of improved mechanical and antiblocking properties made from a blend of (i) a linear ethylene polymer having a density of less than 0.940 g.cc.$^{-1}$ and (ii) 5 to 30 weight percent of the blend of a linear ethylene polymer having a density of less than 0.940 g.cc.$^{-1}$ modified by treatment at an elevated temperature with 0.01 to 5 weight percent, based on the weight of the modified polymer, of an organic, peroxy free radical generator and from 0.01 to 5 weight percent, based on the weight of the modified polymer, of an unsaturated silane compound.

10. A method of increasing the melt strength of a linear, low density ethylene polymer which comprises blending the polymer with a linear, low-density ethylene polymer which has been modified by reaction in the molten state with a free radical generator, said modified polymer comprising 5 to 30 weight percent of the blend.

11. A method according to claim 10 in which the free radical generator comprises an organic peroxy compound.

12. A method according to claim 11 in which the peroxy compound comprises t-butyl peroxy pivalate, t-butyl hydroperoxide or dicumyl peroxide.

13. A method according to claim 10 in which the modified polymer is modified by reaction with an unsaturated organic silane compound in the presence of the free radical generator.

14. A method according to claim 13 in which the silane compound vinyl trimethoxysilane or vinyl triethoxysilane.

15. A method according to claim 10 in which the amount of free radical generator is from 0.01 to 5 weight percent of the modified polymer.

16. A method according to claim 13 in which the amount of unsaturated silane compound is from 0.01 to 5 weight percent of the modified polymer.

17. A method according to claim 10 in which the blend is formed from (i) a linear ethylene polymer having a density of less than 0.940 g.cc.$^{-1}$ and (ii) 5 to 30 weight percent of the blend of a linear ethylene polymer having a density of less than 0.940 g.cc.$^{-1}$ modified by treatment at an elevated temperature with 0.01 to 5 weight percent, based on the weight of the modified polymer, of an organic, peroxy free radical generator and from 0.01 to 5 weight percent, based on the weight of the modified polymer, of an unsaturated silane oompound.

18. A method of improving the antiblocking properties of a film made from a linear, low density ethylene polymer, which comprises blending with the polymer from which the film is formed, a linear, low density ethylene polymer modified by reaction with a free radical generator, said modified polymer comprising 5 to 30 weight percent of the blend.

19. A method according to claim 18 in which the free radical generator comprises an organic peroxy compound.

20. A method according to claim 19 in which the peroxy compound comprises t-butyl peroxy pivalate, t-butyl hydroperoxide or dicumyl peroxide.

21. A method according to claim 18 in which the modified polymer is modified by reaction with an unsaturated organic silane compound in the presence of the free radical generator.

22. A method according to claim 21 in which the silane compound vinyl trimethoxysilane or vinyl triethoxysilane.

23. A method according to claim 18 in which the amount of free radical generator is from 0.01 to 5 weight percent of the modified polymer.

24. A method according to claim 21 in which the amount of unsaturated silane compound is from 0.01 to 5 weight percent of the modified polymer.

25. A method according to claim 18 in which the film is a blown film produced by the tubular film blowing process.

* * * * *